United States Patent
Bleyer

(10) Patent No.: US 9,617,950 B2
(45) Date of Patent: Apr. 11, 2017

(54) CYLINDER HEAD WITH FUEL GUIDING PORTION

(75) Inventor: Benjamin Bleyer, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 193 days.

(21) Appl. No.: 14/362,778

(22) PCT Filed: Sep. 14, 2012

(86) PCT No.: PCT/EP2012/003852
§ 371 (c)(1),
(2), (4) Date: Jul. 2, 2014

(87) PCT Pub. No.: WO2013/087128
PCT Pub. Date: Jun. 20, 2013

(65) Prior Publication Data
US 2014/0305408 A1 Oct. 16, 2014

(30) Foreign Application Priority Data

Dec. 13, 2011 (EP) ..................................... 11193310

(51) Int. Cl.
*F02M 69/04* (2006.01)
*F02B 19/14* (2006.01)
(Continued)

(52) U.S. Cl.
CPC ............ *F02F 1/243* (2013.01); *F02F 1/4235* (2013.01); *F02M 21/0281* (2013.01);
(Continued)

(58) Field of Classification Search
CPC .................. F02D 19/0694; F02D 9/02; F02D 2009/0201; F02D 41/3005; F02D 9/107;
(Continued)

(56) References Cited

U.S. PATENT DOCUMENTS 4,395,989 A * 8/1983 Eshelman ............... F02D 41/02
123/478
4,406,266 A * 9/1983 Kiesling ................. F02D 41/32
123/438

(Continued)

FOREIGN PATENT DOCUMENTS

CN 202023646 11/2011
DE 4224908 A1 7/1992
(Continued)

OTHER PUBLICATIONS

English-language European Search Report from European Patent Office for European Patent Application No. 11193310.7, mailed Apr. 24, 2012 (3 pages).

(Continued)

*Primary Examiner* — Marguerite McMahon
*Assistant Examiner* — Tea Holbrook

(57) ABSTRACT

A cylinder head for an internal combustion engine is configured to be operated with fuel, such as gaseous or liquid fuel, to provide a more complete combustion of the fuel/air mixture. The cylinder head has at least one fuel guiding section, which includes a fuel inlet valve casing for accommodating a fuel inlet valve configured to control a fuel flow rate, a fuel/air mixing chamber for mixing the fuel with air, and a fuel guiding portion connecting the fuel inlet valve casing to the fuel/air mixture chamber. The fuel guiding portion is integrally formed with the cylinder head and defines at least a first fuel feeding passage and at least a second fuel feeding passage. The first fuel feeding passage and the second fuel feeding passage extend from the fuel inlet valve casing to the fuel/air mixing chamber.

15 Claims, 6 Drawing Sheets

(51) Int. Cl.
*F02B 77/00* (2006.01)
*F02F 1/24* (2006.01)
*F02M 35/10* (2006.01)
*F02F 1/42* (2006.01)
*F02M 21/02* (2006.01)

(52) U.S. Cl.
CPC .. *F02M 21/0296* (2013.01); *F02M 35/10216* (2013.01); *F02M 35/10347* (2013.01); *Y02T 10/146* (2013.01); *Y02T 10/32* (2013.01); *Y10T 29/4927* (2015.01)

(58) Field of Classification Search
CPC .. F02M 43/00; F02M 21/0281; F02M 21/042; F02M 21/0218; F02M 35/048; F02M 9/085; F02M 35/10216; F02F 1/243; F02F 2001/245; F02F 1/4235; F02F 1/40
See application file for complete search history.

(56) References Cited

U.S. PATENT DOCUMENTS

| | | | | | |
|---|---|---|---|---|---|
| 4,671,234 | A | * | 6/1987 | Tegtmeier | F02M 35/10072 123/308 |
| 4,674,460 | A | * | 6/1987 | Asmus | F02M 69/08 123/445 |
| 4,852,526 | A | * | 8/1989 | Brown | F02M 33/04 123/184.42 |
| 4,924,834 | A | * | 5/1990 | Bonfiglioli | F02M 35/10085 123/184.45 |
| 5,146,897 | A | * | 9/1992 | Hattori | F02M 69/044 123/184.38 |
| 5,197,532 | A | * | 3/1993 | Cagle | B22C 9/103 164/137 |
| 5,564,384 | A | * | 10/1996 | Ohsuga | F02B 31/08 123/306 |
| 5,575,263 | A | * | 11/1996 | Pontoppidan | F02M 35/10216 123/432 |
| 5,829,408 | A | | 11/1998 | Yamaguchi et al. | |
| 6,453,888 | B1 | * | 9/2002 | Ueda | F02M 35/10085 123/531 |
| 6,830,029 | B2 | * | 12/2004 | Katayama | F02B 23/104 123/305 |
| 2005/0082028 | A1 | * | 4/2005 | Akaba | B22C 9/10 164/98 |
| 2006/0108084 | A1 | * | 5/2006 | Bassi | B22C 7/02 164/34 |
| 2009/0000578 | A1 | * | 1/2009 | Reustle | B22C 9/103 123/41.82 R |
| 2013/0042836 | A1 | * | 2/2013 | Trembath | F02M 43/00 123/470 |
| 2014/0076287 | A1 | * | 3/2014 | Yamamoto | F02M 25/08 123/520 |

FOREIGN PATENT DOCUMENTS

| | | | |
|---|---|---|---|
| EP | 0715069 A1 | 6/1996 | |
| FR | 2655381 A1 | 12/1989 | |
| FR | EP 0715069 A1 * | 6/1996 | ....... F02M 35/10216 |
| GB | 564711 | 4/1943 | |
| IT | CA 2500794 A1 * | 4/2004 | ............... B22C 7/02 |

OTHER PUBLICATIONS

English-language International Search Report from European Patent Office for International Patent Application No. PCT/EP2012/003852, mailed Dec. 21, 2012 (4 pages).

* cited by examiner

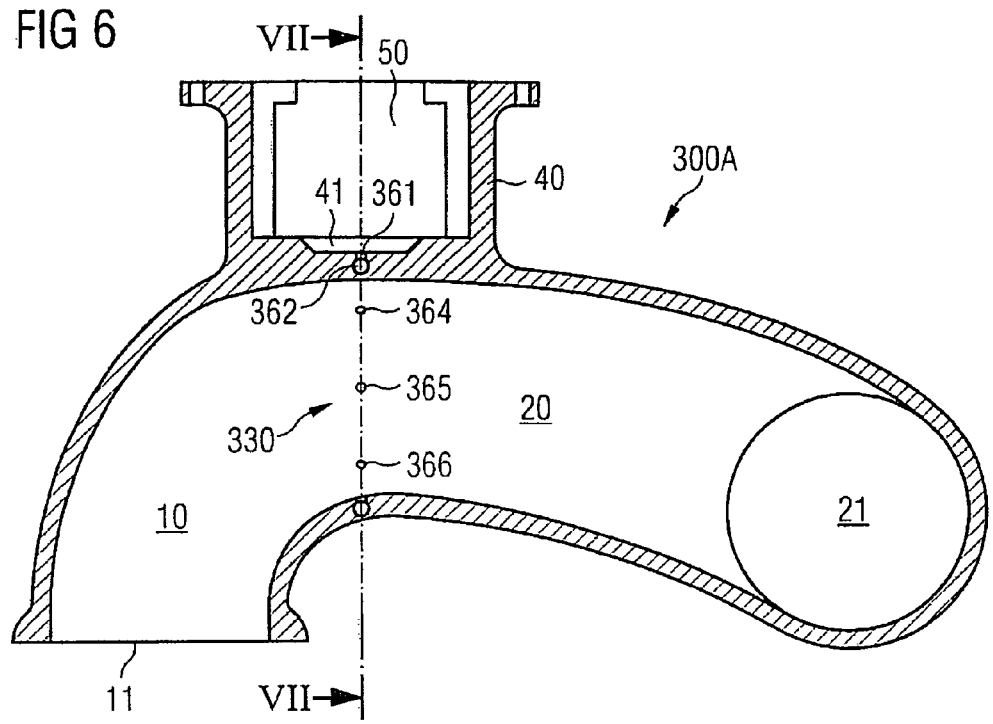
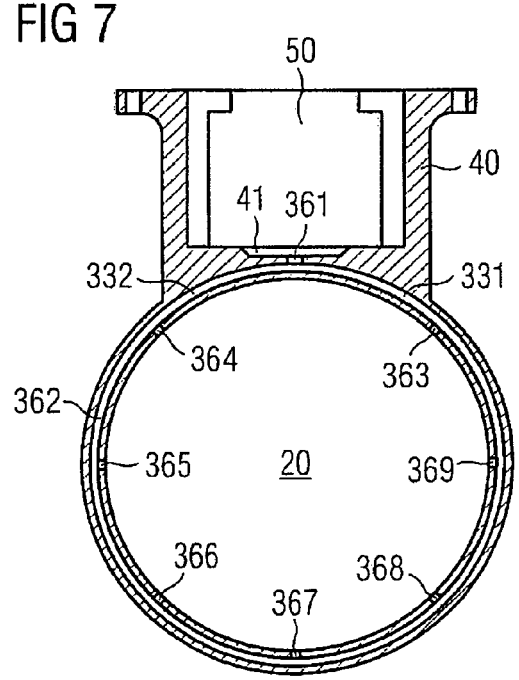

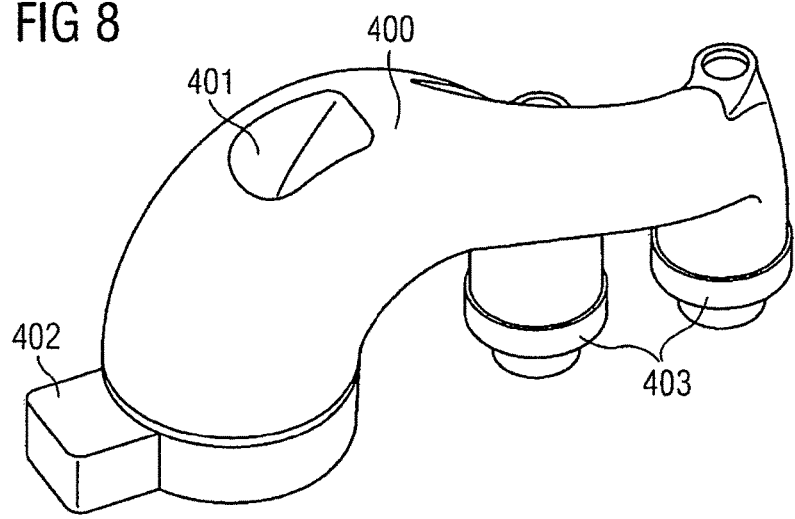
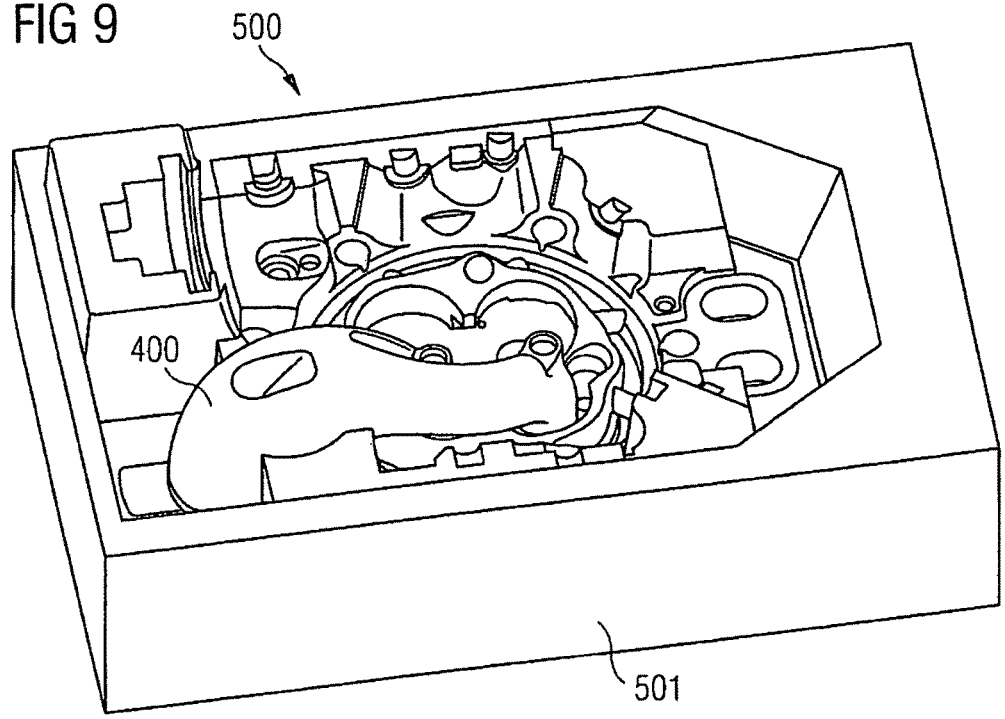

CYLINDER HEAD WITH FUEL GUIDING PORTION

CLAIM FOR PRIORITY

This application is a U.S. national phase entry under 35 U.S.C. 371 from PCT International Application No. PCT/EP2012/003852, filed Sep. 14, 2012, which claims benefit of priority of EP Patent Application No. 11193310.7 filed Dec. 13, 2011, the subject matter of both of which is incorporated herein by reference.

TECHNICAL FIELD

The present disclosure relates to a cylinder head for an internal combustion engine configured to be operated with gaseous or liquid fuel. In particular, the present disclosure relates to a cylinder head comprising a fuel guiding portion.

Furthermore, the present disclosure relates to a method for manufacturing a cylinder head of the type mentioned above.

BACKGROUND

Internal combustion engines may be provided with at least one cylinder head. Usually, the cylinder head may be arranged above the cylinders of the internal combustion engine on top of the cylinder block and may include fuel inlet valves, passages for feeding air and fuel to the cylinder, spark plugs, fuel injectors and passages for feeding exhaust gas.

In conventional internal combustion engines, the fuel to be fed to the cylinders may be mixed with air to allow an efficient combustion. For this purpose, it may be necessary that the fuel completely mixes with the air, i.e., that the fuel is evenly distributed in the air.

US 2008/0271700 A1 discloses a cylinder head for an internal combustion engine which includes an air duct for injecting gas into a flow channel. The air duct is produced by means of casting.

Further, EP 0 715 069 A1 discloses an air intake tract element adapted to accommodate an injector and to be fixed to the cylinder head of an engine.

The present disclosure is directed, at least in part, to improving or overcoming one or more aspects of prior systems.

SUMMARY OF THE DISCLOSURE

In an aspect of the present disclosure, a cylinder head with at least one fuel guiding section for an internal combustion engine which is configured to be operated with fuel, such as gaseous or liquid fuel, may comprise a fuel inlet valve casing for accommodating a fuel inlet valve configured to control a fuel flow rate, a fuel/air mixing chamber for mixing the fuel with air and a fuel guiding portion connecting the fuel inlet valve casing to the fuel/air mixing chamber. The fuel guiding portion may be integrally formed with the cylinder head and defines at least a first fuel feeding passage and at least a second fuel feeding passage, the first fuel feeding passage and the second fuel feeding passage extending from the fuel inlet valve casing to the fuel/air mixing chamber.

In a further aspect of the present disclosure, a method for manufacturing a cylinder head for an internal combustion engine configured to be operated with fuel, such as gaseous or liquid fuel, may comprise the following steps:

providing a core defining an inner wall of a fuel/air mixing chamber and an inner wall of a fuel guiding portion, the core being made from sand;

providing a mold defining an outer wall of the fuel/air mixing chamber and the fuel guiding portion, the mold being divided into at least two parts;

arranging the core in the mold;

filling the mold with a casting material;

cooling down the casting material;

removing the mold and the core; and providing at least two holes in the fuel guiding portion for defining a first fuel feeding passage and a second fuel feeding passage extending from the outside to the inside of the cylinder head.

Other features and aspects of this disclosure will be apparent from the following description and the accompanying drawings.

BRIEF DESCRIPTION OF THE DRAWINGS

FIG. 6 shows a cross-sectional view of a fuel guiding section according to a fourth embodiment of the present disclosure;

FIG. 7 shows a vertical cross-sectional view along the line VII-VII of the fuel guiding section of FIG. 6;

FIG. 8 shows a perspective view of a core for manufacturing the fuel guiding section of FIG. 1;

FIG. 9 shows a perspective view of the core of FIG. 8 arranged in a mold for manufacturing the fuel guiding section of FIG. 1.

DETAILED DESCRIPTION

Figure 1:
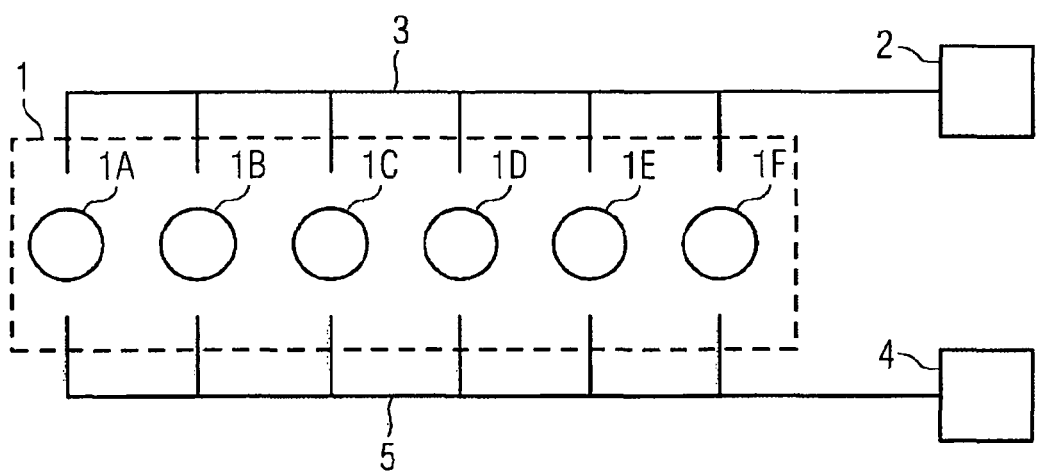
FIG. 1 shows a schematical overview of a cylinder head connected to a fuel reservoir via a fuel supply pipe and to an exhaust gas treatment device via an exhaust gas supply pipe, the cylinder head having a plurality of fuel guiding sections.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

Referring to FIG. 1, a cylinder head 1 for an internal combustion engine (not shown) is shown. Cylinder head 1 may comprise six fuel guiding sections 1A, 1B, 1C, 1D, 1E, 1F. Alternatively, cylinder head 1 may comprise less or more than six fuel guiding sections, for example four, eight or twelve fuel guiding sections. Each guiding section 1A, 1B, 1C, 1D, 1E, 1F may be connected to a fuel reservoir 2 via a fuel supply pipe 3. Fuel reservoir 2 may be a tank or a container filled with fuel, such as gaseous fuel or liquid fuel, for example diesel fuel. Further, each fuel guiding section 1A, 1B, 1C, 1D, 1E, 1F may be connected to an exhaust gas treatment device 4 via an exhaust gas supply pipe 5. Exhaust gas treatment device 4 may be a known catalytic converter used to convert toxic exhaust gas emissions from the internal combustion engine into non-toxic or at least less-toxic substances. Each fuel guiding section 1A, 1B, 1C, 1D, 1E, 1F may be associated with a cylinder (not shown) of the internal combustion engine.

Figure 2:
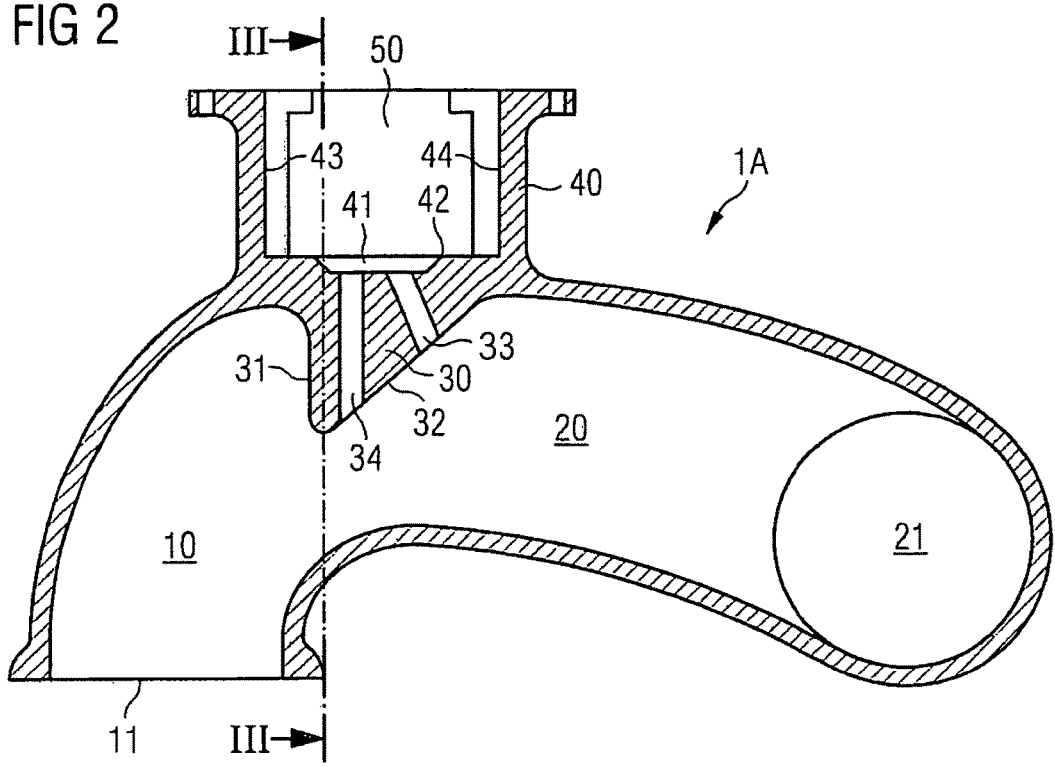
FIG. 2 shows a cross-sectional view of a fuel guiding section according to a first embodiment of the present disclosure.

Referring to FIG. 2, a cross-sectional view of a fuel guiding section 1A according to a first embodiment of the present disclosure is shown. Fuel guiding section 1A may comprise an air intake chamber 10, a fuel/air mixing chamber 20, a fuel guiding portion 30 and a fuel inlet valve casing 40.

Air intake chamber 10 may have a bent/curved configuration. Similarly, fuel/air mixing chamber 20 may have a bent/curved configuration. Alternatively, both air intake chamber 10 and fuel/air mixing chamber 20 may have a linear or any other suitable configuration. Air intake chamber 10 may be integrally formed with fuel guiding section 1A, in particular, with fuel/air mixing chamber 20. Specifically, air intake chamber 10 may be integrally casted on fuel/air mixing chamber 20. Fuel/air mixing chamber 20 may have a mixed fuel/air opening 21 disposed at the end of fuel/air mixing chamber 20 opposing the end of fuel/air mixing chamber 20 at which air intake chamber 10 is arranged. Mixed fuel/air opening 21 may connect fluidly fuel/air mixing chamber 20 with one of the cylinders of the internal combustion engine. Mixed fuel/air opening 21 may have a circular shape. Alternatively, mixed fuel/air opening 21 may have an elliptical shape or any other suitable shape. Air intake chamber 10 may have an air opening 11 disposed at the end of air intake chamber 10 opposing the end at which fuel/air mixing chamber 20 is arranged. Air opening 11 may connect fluidly air intake chamber 10 with an air induction system (not shown). Air opening 11 may have a circular shape. Alternatively, air opening 11 may have an elliptical or any other suitable shape. It should be noted that fuel guiding section 1A may not have air intake chamber 10, but may be connected directly to an air induction system.

Fuel guiding portion 30 may be integrally formed with fuel guiding section 1A, in particular, with air intake chamber 10 and fuel/air mixing chamber 20. For example, fuel guiding portion 30 may be integrally formed with fuel guiding section 1A at a transition position from air intake chamber 10 to fuel/air mixing chamber 20. Fuel guiding portion 30 may have a nose- or ridge-like shape. For example, fuel guiding portion 30 may have a substantial triangular shape in the cross-sectional view as shown in FIG. 2. Fuel guiding portion 30 may extend into air intake chamber 10 and/or fuel/air mixing chamber 20 such that a first surface portion 31 of fuel guiding portion 30 which faces air intake chamber 10 may run in an up-and-down-direction as viewed in FIG. 2 and a second surface portion 32 of fuel guiding portion 30 which faces fuel/air mixing chamber 20 may extend obliquely with reference to an up-and-down-direction as viewed in FIG. 2. Due to the oblique extension of second surface portion 32, second surface portion 32 of fuel guiding portion 30 may form a defined inclined edge. Further, fuel guiding portion 30 may comprise a first fuel feeding passage 33 and a second fuel feeding passage 34. Alternatively, fuel guiding portion 30 may have more than two fuel feeding passages. First fuel feeding passage 33 may obliquely extend through fuel guiding portion 30, i.e., first fuel feeding passage 33 may pass through fuel guiding portion 30 in an inclined manner. Second fuel feeding passage 34 may extend through fuel guiding portion 30 in an up-and-down-direction as viewed in FIG. 2 such that first fuel feeding passage 33 is arranged angularly to second fuel feeding passage 34. First and second fuel feeding passages 33, 34 may be formed circularly. In this case, first and second fuel feeding passages 33, 34 may have the same diameter, for example 32 mm. Alternatively, first and second fuel feeding passages 33, 34 may have different diameters. For example, first fuel feeding passage 33 may have a diameter of 32 mm, in particular, 32.4 mm, and second fuel feeding passage 34 may have a diameter of 37 mm, in particular, 37.2 mm. Alternatively, both or at least one of first and second fuel feeding passages 33, 34 may comprise a non-circular cross-section, such as a quadrangular or a polygonal cross-section. In this case, first and second fuel feeding passages 33, 34 may have the same cross-section or a different cross-section. The angle between first and second fuel feeding passages 33, 34 may range between 15° to 17°, preferably 16°. Alternatively, the angle between first and second fuel feeding passages 33, 34 may range between 10° and 15° or 17° and 25°.

Fuel inlet valve casing 40 may be integrally formed with fuel guiding section 1A. In particular, fuel inlet valve casing 40 may be casted on air intake chamber 10 and fuel/air mixing chamber 20 in the region of the transition position, i.e., at the position where fuel guiding portion 30 is arranged. Alternatively, fuel inlet valve casing 40 may be formed as a separate component mechanically connected to fuel/air mixing chamber 20. For example fuel inlet valve casing 40 may be screwed or bolted to fuel/air mixing chamber 20. Fuel inlet valve casing 40 may have a substantially rectangular cross-section as viewed in FIG. 2 and may have a cup-like shape. In a bottom portion of fuel inlet valve casing 40, a recess 41 may be formed. Recess 41 may have a substantially trapezoid cross-section with sharp edges as viewed as viewed in FIG. 2. Alternatively, recess 41 may have a substantially rectangular shape, for example with sharp edges or round corners, or any other suitable shape. Recess 41 may have a circumferential edge 42 spaced from a left casing wall 43 and a right casing wall 44 as viewed in FIG. 2. Recess 41 may be connected fluidly to both first fuel feeding passage 33 and second fuel feeding passage 34. That is, both fuel feeding passages 33, 34 may extend from recess 41 to fuel/air mixing chamber 20 such that fuel inlet valve 50 is connected fluidly to recess 41. Alternatively, in case there is no recess 41, first and second fuel feeding passages 33, 34 may also be connected fluidly to fuel inlet valve casing 40, in particular, the bottom portion of fuel inlet valve casing 40. Further, fuel inlet valve casing 40 may house a fuel inlet valve 50. Fuel inlet valve 50 may be disposed in fuel inlet valve casing 40 with a predetermined distance between fuel inlet valve 50 and casing walls 43, 44. Alternatively, fuel inlet valve 50 may be inserted into fuel inlet valve casing 40 such that it abuts against casing walls 43, 44.

Figure 3:
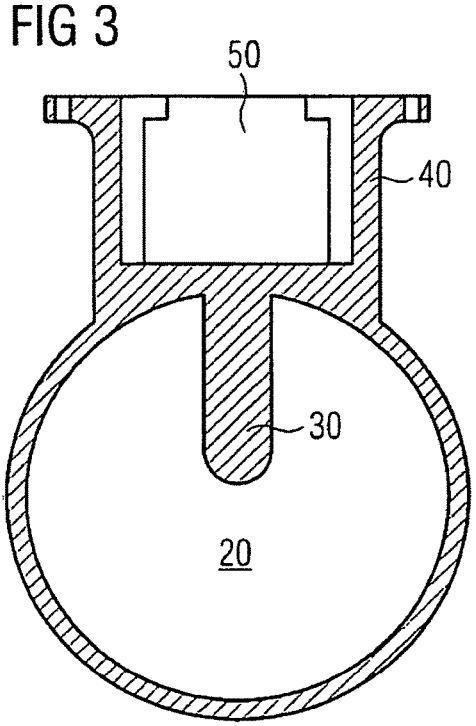
FIG. 3 shows a vertical cross-sectional view along the line III-III of the fuel guiding section of FIG. 2.

Referring to FIG. 3, a cross-sectional view of fuel guiding section 1A taken along line III-III in FIG. 2 is shown. In particular, FIG. 3 shows that fuel/air mixing chamber 20 may have a circular cross-section. Alternatively, fuel/air mixing chamber 20 may have an elliptical or any other suitable cross-section. Further, fuel guiding portion 30 may extend into fuel/air mixing chamber 20 and air intake chamber 10 at the transition position, possibly centrally, from an upper portion thereof. In other words, fuel guiding portion 30 may be equally spaced from an inner wall of fuel/air mixing chamber 20 in a left-right direction as viewed in FIG. 3 and may extend to a center of the circular cross-section of fuel/air mixing chamber 20 at the transition position. That is, the lowest point of fuel guiding portion 30 may be disposed in the center of the cross-section of fuel/air mixing chamber 20 and air intake chamber 10 at the transition position. Alternatively, the lowest point of fuel guiding portion 30 may be arranged above or below the center of the cross-section of fuel/air mixing chamber 20 and the air intake chamber 10. That is, fuel guiding portion may also be shorter or longer in an up-and-down direction as viewed in FIG. 3. Alternatively or additionally, fuel guiding portion may be located closer to the left or the right portion of inner wall 22 of fuel/air mixing chamber 20 in a left-right-direction.

Figure 4:
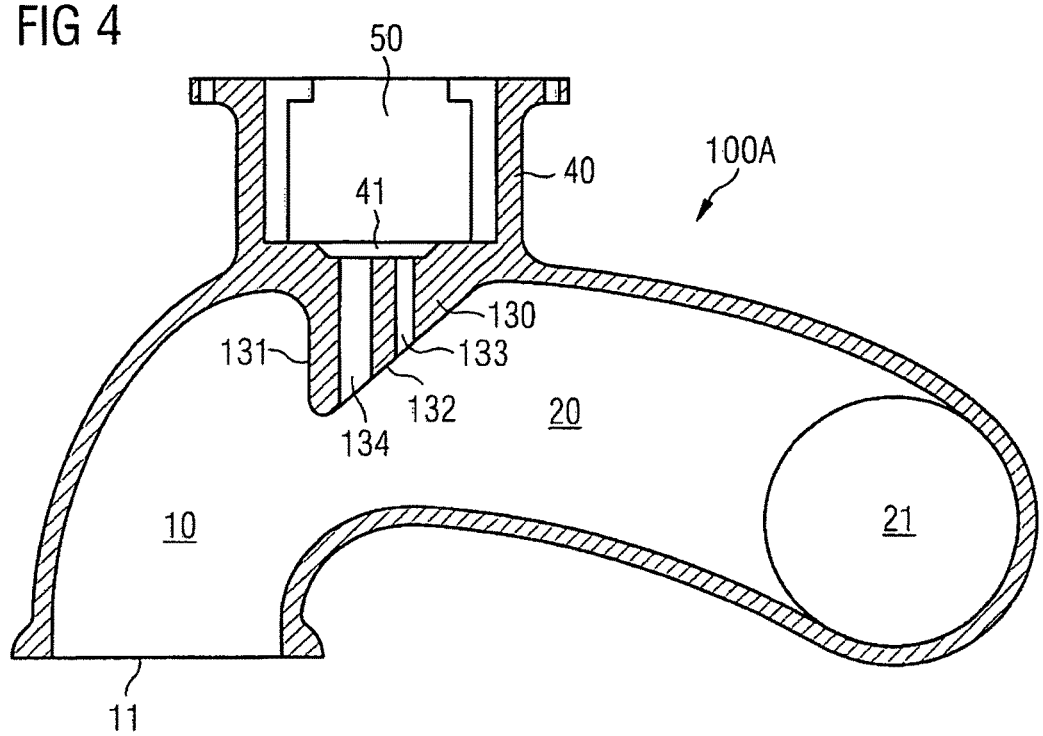
FIG. 4 shows a cross-sectional view of a fuel guiding section according to a second embodiment of the present disclosure.

Referring to FIG. 4, fuel guiding section 100A according to a second embodiment of the present disclosure is shown. Fuel guiding section 100A differs from fuel guiding section 1A according to the first embodiment in the construction of the fuel guiding portion. Accordingly, the features of fuel guiding section 100A which are unmodified compared to the features of fuel guiding section 1A are provided with the same reference numerals and their description will be omitted in the following.

In the second embodiment, fuel guiding section 100A comprises a fuel guiding portion 130. Fuel guiding portion 130 has the same nose- or ridge-like shape as fuel guiding portion 30 with a first surface portion 131 and a second surface portion 132 according to the first embodiment. Fuel guiding portion 130 may have a first fuel feeding passage 133 and a second fuel feeding passage 134. Alternatively, fuel guiding portion 130 may have more than two fuel feeding passages 133, 134. First fuel feeding passage 133 may extend parallel to second fuel feeding passage 134. Further, first fuel feeding passage 133 may have a smaller cross-section than second fuel feeding passage 134. In case of a circular shape, first fuel feeding passage may have a smaller diameter, for example 32 mm, in particular, 32.4 mm, than second fuel feeding passage 134 having for example a diameter of 37 mm, in particular, 37.2 mm. Alternatively, first and second fuel feeding passages 133, 134 may have the same cross-section and the same diameter, respectively, such as a diameter between 30 and 40 mm, for example, 34 mm, 36 mm, 38 mm.

Figure 5:
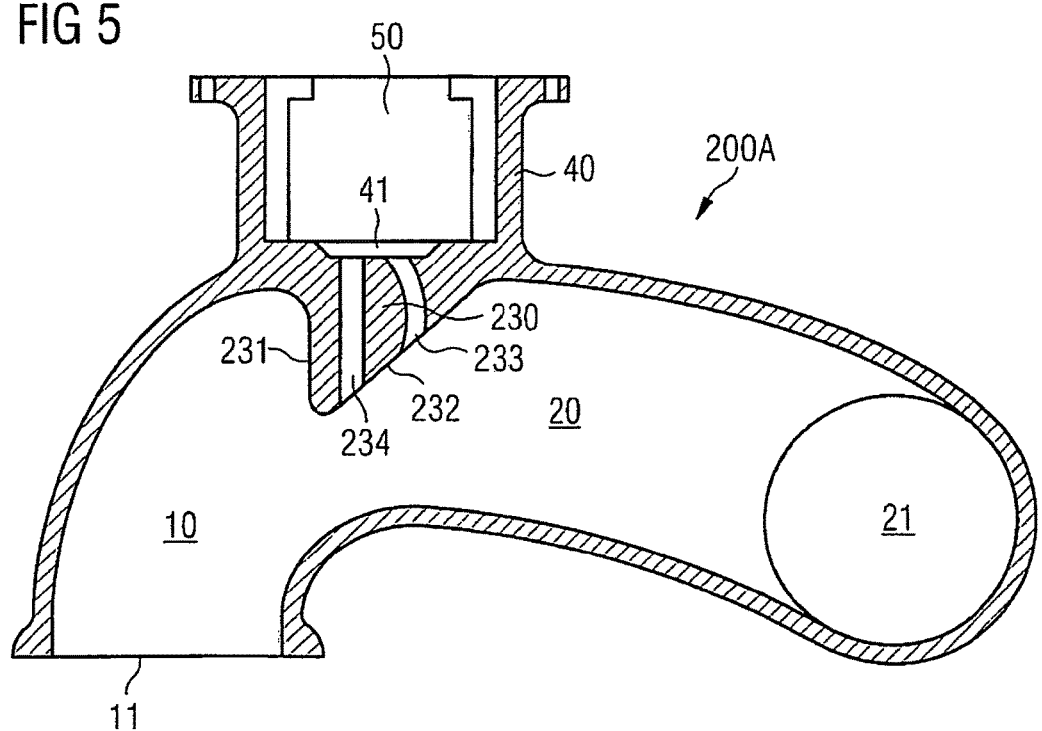
FIG. 5 shows a cross-sectional view of a fuel guiding section according to a third embodiment of the present disclosure.

Referring to FIG. 5, fuel guiding section 200A according to a third embodiment of the present disclosure is shown. Fuel guiding section 200A differs from fuel guiding section 1A in the construction of the fuel guiding portion. Accordingly, the features of fuel guiding section 200A which are unmodified compared to fuel guiding section 1A are provided with the same reference numerals and there description will be omitted in the following.

Fuel guiding section 200A may comprise a fuel guiding portion 230. Fuel guiding portion 230 may have the same nose- or ridge-like shape as fuel guiding portion 30 with a first surface portion 231 and a second surface portion 232 according to the first embodiment. Fuel guiding portion 230 may comprise a first fuel feeding passage 233 and a second fuel feeding passage 234. Alternatively, fuel guiding portion 230 may comprise more than two fuel feeding passages. First fuel feeding passage 233 may extend from recess 41 to fuel/air mixing chamber 20 in a curved manner. In other words, first fuel feeding passage 233 may define a passage having a certain radius, and, hence, being not linear. Second fuel feeding passage 234 may linearly extend from recess 41 to fuel/air mixing chamber 20. Alternatively, second fuel feeding passage 234 or both fuel feeding passages 233, 234 may be curved. First fuel feeding passage 233 may have a larger cross-section than second fuel feeding passage 234. For example, in case of circular first and second fuel feeding passages 233, 234, first fuel feeding passage 233 may have a larger diameter, for example 37 mm, in particular, 37.2 mm, than second fuel feeding passage 234 having for example a diameter of 32 mm, in particular, 32.4 mm. Alternatively, first and second fuel feeding passages 233, 234 may have the same cross-section, for example the same diameter, such as a diameter between 30 and 40 mm, for example, 34 mm, 36 mm, 38 mm.

Referring to FIG. 6, fuel guiding section 300A according to a fourth embodiment of the present disclosure is shown. Fuel guiding section 300A differs from fuel guiding section 1A according to the first embodiment in the construction of the fuel guiding portion. Accordingly, the features of fuel guiding section 300A which are unmodified compared to the features of fuel guiding section 1A are provided with the same reference numerals and their description will be omitted in the following.

Fuel guiding section 300A may comprise a fuel guiding portion 330 having an outer connection duct element 361, a circular duct line 362, a first inner connection duct element 363, a second inner connection duct element 364, a third inner connection duct element 365, a fourth inner connection duct element 366, a fifth inner connection duct element 367, a sixth inner connection duct element 368 and a seventh inner connection duct element 369. Alternatively, fuel guiding portion 330 may have less than seven inner connection duct elements, for example, two, three, four, five, six or more than seven inner connection duct elements. In case of two inner connection duct elements, one of these two inner connection duct elements, the circular duct line 362 and the outer duct element 361 form a first fuel feedings passage 331 and the other one of these two inner connection duct elements, the circular duct line 362 and the outer duct element 361 form a second fuel feedings passage 332. Circular duct line 362 may be arranged within an outer wall portion of fuel guiding section 300A at the transition position of air intake chamber 10 to fuel/air mixing chamber 20. Outer connection duct element 361 may connect fluidly circular duct line 362 with recess 41 or, in case no recess 41 is provided, with the bottom portion of fuel inlet valve casing 40. Further, the seven inner connection duct elements 363, 364, 365, 366, 367, 368, 369 may connect fluidly circular duct line 362 with fuel/air mixing chamber 20 and air intake chamber 10. Inner connection duct elements 364, 365, 366, 367, 368, 369 may extend radial in an inner wall portion of fuel guiding section 300A at the transition position from air intake chamber 10 to fuel/air mixing chamber 20. Further, each inner connection duct element 363, 364, 365, 366, 367, 368, 369 may have a smaller cross-section than outer connection duct element 361 and circular duct line 362 which may have the same cross-section or different cross-sections. Preferably, the cross-section of circular duct line 362 may correspond to the cross-sections of all inner connection duct elements 363, 364, 365, 366, 367, 368, 369 together.

Referring to FIG. 8, a core 400 for manufacturing fuel guiding section 1A is shown. Core 400 may have a bent/curved shape with a cavity 401 located at a position of the smallest radius, that is at a position of the smallest curvature of core 400. Cavity 401 corresponds to the part of core 400 for manufacturing fuel guiding portion 30. Further, core 400 may comprise a boss 402 at a lower left side of the core as viewed in FIG. 8. Boss 402 may serve as a chaplet for supporting core 400 when being mounted into mold 500. Core 400 may be made of pit-iron sand. Alternatively, core 400 may be made of pit-iron sand mixed with synthetic resin, wax or furan resin.

Referring to FIG. 9, a lower portion 501 of a mold 500 is shown. Lower portion 501 may be made of any known mold material such as cast iron or steel. In lower portion 501, core 400 may be arranged. Boss 402 may serve as a chaplet for supporting core 400 when being mounted into mold 500. Lower portion 501 may have a substantially rectangular outer shape and may, additionally to the contour of fuel guiding section 1A defined by core 400, define further components of the internal combustion engine, which will not be referred to in this description. Upper portion of mold 500 is not shown.

Figure 10:
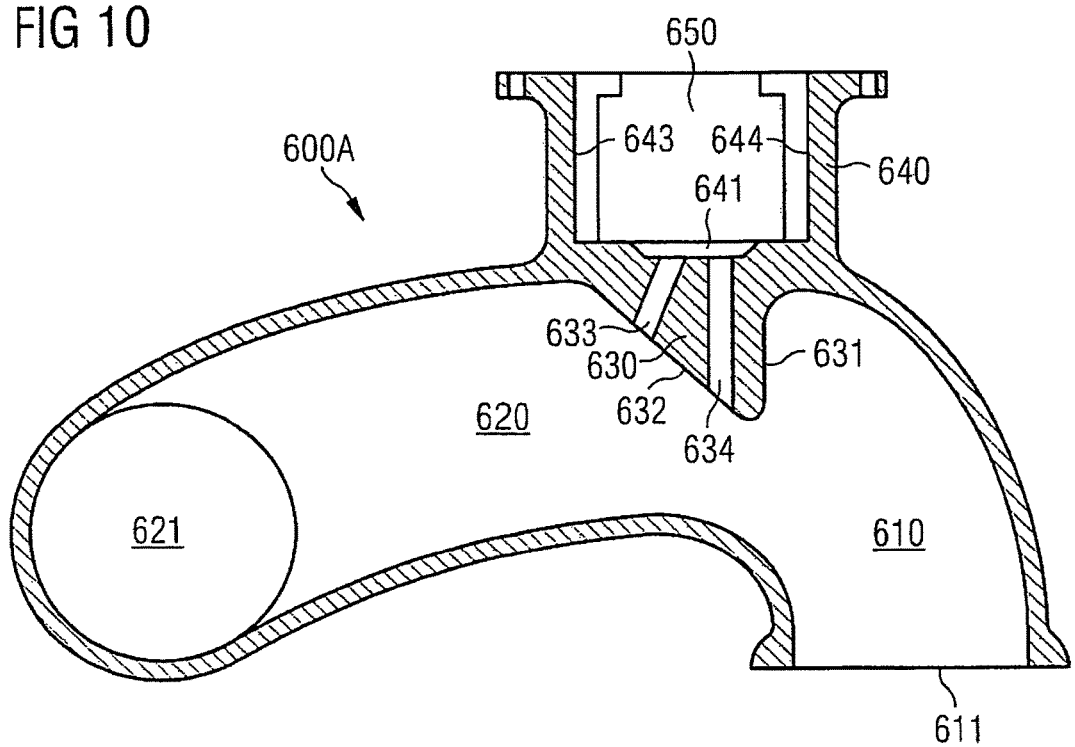
FIG. 10 shows a cross-sectional view of an exhaust gas guiding section according to an exemplary embodiment of the present disclosure.

Referring to FIG. 10, an exhaust gas guiding section 600A is shown. Exhaust gas guiding section 600A is constructed in accordance with fuel guiding section 1A. Alternatively, exhaust gas guiding section 600A may be constructed in accordance with fuel guiding sections 100A, 200A or 300A.

Exhaust gas guiding section 600A may comprise an exhaust gas outlet chamber 610 and an exhaust gas/gas mixing chamber 620. Exhaust gas outlet chamber 610 may be integrally formed with exhaust gas/gas mixing chamber 620. For example, exhaust gas outlet chamber 610 may be casted on exhaust gas/gas mixing chamber 620. Exhaust gas outlet chamber 610 may have an exhaust gas opening 611 at an end opposing the end of exhaust gas outlet chamber 610 which defines a transition position from exhaust gas outlet chamber 610 to exhaust gas/gas mixing chamber 620. Similarly, exhaust gas/gas mixing chamber may comprise a mixed exhaust gas/gas opening 621 at an end of exhaust gas/gas mixing chamber which opposes the transition position of exhaust gas outlet chamber 610 to exhaust gas/gas mixing chamber 620. Exhaust gas opening 611 may be arranged perpendicularly to mixed exhaust gas/gas opening 621.

Exhaust gas guiding section 600A may further comprise an exhaust gas guiding portion 630. Exhaust gas guiding portion 630 may have a nose- or ridge-like shape. Exhaust gas guiding portion 630 may extend into exhaust gas outlet chamber 610 and exhaust gas/gas mixing chamber 620 at the transition position from exhaust gas outlet chamber 610 to exhaust gas/gas mixing chamber 620. In particular, exhaust gas guiding portion 630 may have a first surface portion 631 which extends in an up-and-down direction in exhaust gas outlet chamber 610 as viewed in FIG. 10 and a second surface portion 632 which extends obliquely in exhaust gas/gas mixing chamber 620. In other words, exhaust gas guiding portion 630 may define a substantially triangular shape as viewed in FIG. 10. Alternatively, exhaust gas guiding portion 630 may be arranged such that its first surface which extends in an up-and-down-direction may face exhaust gas/gas mixing chamber 620 and such that its second surface which extends obliquely may face exhaust gas outlet chamber 610. In this case, gas feeding passages 633, 634 may be directed to exhaust gas opening 611 and may guide gas into exhaust gas outlet chamber 610.

Exhaust gas guiding portion 630 may comprise a first exhaust gas feeding passage 633 and a second exhaust gas feeding passage 634. First exhaust gas feeding passage 633 may be angularly arranged to second exhaust gas feeding passage 634. Further, first exhaust gas feeding passage 633 may be shorter than second exhaust gas feeding passage 634. First and second exhaust gas feeding passages 633, 634 may have the same diameter. Alternatively, first and second exhaust gas feeding passages 633, 634 may have different diameters. Furthermore, exhaust gas guiding portion may have more than two exhaust gas feeding passages. Moreover, exhaust gas feeding passages 633, 634 may be arranged parallel to each other or at least one of exhaust gas feeding passages 633, 634 may be bent.

Further, exhaust gas guiding section 600A may comprise a gas inlet valve casing 640. Gas inlet valve casing 640 may be arranged in top of exhaust gas guiding portion 630. Gas inlet valve casing 640 may comprise a recess 641. Recess 641 may be fluidly connected to first and second exhaust gas feeding passages 633, 634. Recess 641 may have a substantial trapezoidal cross-section as viewed in FIG. 10. Alternatively, recess 641 may have a substantial rectangular cross-section. Gas inlet valve casing 640 may house a gas inlet valve 650. Gas inlet valve 650 may be arranged in gas inlet valve casing 640 such that the outer surface of gas inlet valve 650 is spaced from casing walls 643, 644 of gas inlet valve casing 640. Alternatively, gas inlet valve 650 may be arranged in gas inlet valve casing 640 such that there is no space between the outer surface of gas inlet valve 650 and casing walls 643, 644 of gas inlet valve casing 640.

Alternatively, as mentioned above, exhaust gas guiding section 600A may also be constructed in accordance with fuel guiding sections 100A, 200A, 300A. In particular, exhaust gas guiding section 600A may also comprise an exhaust gas guiding portion having a circular duct line, an outer connection duct element and a plurality of inner connection duct elements as with fuel guiding section 300A.

INDUSTRIAL APPLICABILITY

During operation of the internal combustion engine, fuel, such as gaseous or liquid fuel, for example diesel fuel, may be supplied from fuel reservoir 2, such as a tank, via fuel supply pipe 3 to cylinder head 1, in particular, to each fuel guiding section 1A, 1B, 1C, 1D, 1E, 1F for being supplied to the cylinders of the internal combustion engine.

Referring to fuel guiding section 1A, the fuel may be further supplied through fuel inlet valve 50 which is configured to control a fuel flow rate, for example, to allow or restrict fuel from flowing to the cylinder of the internal combustion engine, and from fuel inlet valve 50 into recess 40.

From recess 41, the fuel may flow through first fuel feeding passage 33 and second fuel feeding passage 34. After having passed fuel inlet valve 50, the fuel may flow into and may gather itself in recess 41 which is configured to collect a predetermined amount of fuel in order always to allow a steady fuel supply through both of first and second fuel feeding passages 33, 34. In other words, recess 40 serves as a reservoir for storing fuel in order to provide an equal supply of fuel to both fuel feeding passages 33, 34. From first and second fuel feeding passages 33, 34, the fuel may flow into fuel/air mixing chamber 20. In fuel/air mixing chamber 20, the fuel may mix with air, in particular, compressed air, sucked from the outside through air intake chamber 10. Specifically, as surface portion 32 of fuel guiding portion 30 extends obliquely in fuel/air mixing chamber 20 and, thus, defines the defined inclined edge between first fuel feeding passage 33 and second fuel feeding passage 34, the fuel may be swirled in a manner that results in an optimum, i.e., an equal mixture of fuel and air. This optimum mixture may further be improved in that fuel guiding portion 30 extends into fuel/air mixing chamber 20 along a vertical centerline in an up-and-down direction as viewed in FIG. 3.

From fuel/air mixing chamber 20, the fuel/air mixture may flow to the cylinder of the internal combustion engine where it may be ignited and combusted.

The same mode of operation and effect may be achieved with fuel guiding sections 100A, 200A, 300A.

In particular, referring to fuel guiding section 300A, an optimum, and, hence, equal mixture of fuel and air can be achieved in that the fuel is supplied from fuel inlet valve 50 to fuel/air mixing chamber 20 at a plurality of predetermined positions along a circumference of an inner wall of fuel/air mixing chamber 20 at the transition position from air intake chamber 10 to fuel/air mixing chamber 20.

Referring to FIGS. 8 and 9, an exemplary method for manufacturing fuel guiding section 1A is described.

Core 400 may be arranged within lower portion 501 of mold 500.

Subsequently, mold 501 may be filled with a casting material, for example, cast iron.

Afterwards, the upper portion of mold 500 may be placed on lower portion 501 and the casting material may be cooled down.

Thereafter, mold 500 and core 400 may be removed. In particular, mold 501 may be taken away from fuel guiding section 1A. Core 400 may be destroyed such that parts of core 400 may be pulled out of fuel guiding section 1A. Destruction of core 400 may be performed by use of pressurized air, shot peening, vibration, knocking, etc.

Finally, two bores may be thrilled from an upper surface of fuel guiding section 1A at the transition position through fuel guiding portion 30, the two bores defining first and second fuel feeding passages 33, 34.

In case fuel inlet valve casing 40 is integrally formed with air intake chamber 10, fuel/air mixing chamber 20 and fuel guiding portion 30, the above described method for manufacturing fuel guiding section 1A includes a further step of arranging a further core (not shown) above core 400, the further core having a cylindrical shape.

The method for manufacturing fuel guiding sections 100A, 200A may be substantially the same as the above described method for manufacturing fuel guiding section 1A. However, the method for manufacturing fuel guiding section 200A may comprise the further step of arranging a further core which has an elongated curved shape for defining curved first fuel feeding passage 233. The further core may be made of sand as core 400.

The method for manufacturing fuel guiding section 300A may comprise the step of arranging a circular duct line 362 around core 400. Circular duct line 362 may have an inner diameter larger than an outer diameter of core 400 at the transition position. Before core 400 is arranged in mold 501, circular duct line 362 may be arranged around core 400 and after removal of core 400 and mold 501, an outer connection duct element 361 and at least two inner connection duct elements may be drilled from the outside of fuel guiding section 300A, in particular, from recess 41, and from the inside into fuel guiding portion 330 to connect fluidly the outside and the inside of fuel guiding section 300A with circular duct line 362.

Referring to FIG. 10, exhaust gas guiding section 600A may function in substantially the same manner, except for supplying exhaust gas and not fuel, and may be manufactured in the same manner as a fuel guiding section 1A. In particular, exhaust gas flowing through exhaust gas outlet chamber 610 and exhaust gas/gas mixing chamber 620 may be mixed with a gas, such as ammonia, before the exhaust gas is supplied to exhaust gas treatment device 4 via exhaust gas pipe 5. Alternatively, liquids may be guided into the exhaust gas flowing through exhaust gas outlet chamber 610 and exhaust gas/gas mixing chamber 620 by use of a liquid inlet valve instead of gas inlet valve 650.

With the above-described constructions of cylinder heads, an optimal mixture of fuel and air and exhaust gas and gas, respectively, may be realized. In particular, the above-described constructions of a cylinder head an equal distribution of fuel in air and gas in exhaust gas, respectively, may be improved and, consequently, a more complete combustion of the fuel/air mixture and a more effective exhaust gas treatment, respectively, may be achieved because of a defined inclined edge of fuel guiding portion or an edge extending around an inner circumference of the fuel guiding section allowing a defined swirl and defined turbulences, respectively, of the fuel to be mixed with air, in particular, compressed air or the exhaust gas to be mixed with gas.

In an embodiment, the fuel inlet valve casing may be integrally formed with, for example casted on, the cylinder head.

In an embodiment, one of the first fuel feeding passage and the second fuel feeding passage may be shorter than the other one of the first fuel feeding passage and the second fuel feeding passage.

In an embodiment, the first fuel feeding passage and the second fuel feeding passage may extend angularly to each other, for example at an angle between 15 and 17 degrees, from the fuel inlet valve casing to the fuel/air mixing chamber.

In an embodiment, the first fuel feeding passage and the second fuel feeding passage may extend parallel to each other.

In an embodiment, one of the first fuel feeding passage and the second fuel feeding passage may have a larger cross-section than the other one of the first fuel feeding passage and the second fuel feeding passage.

In an embodiment, at least one of the first fuel feeding passage and the second fuel feeding passage may extend in a curved manner from the fuel inlet valve casing to the fuel/air mixing chamber.

In an embodiment, the first fuel feeding passage and the second fuel feeding passage may define an outer connection duct element, a circular duct line and a first inner connection duct element and a second inner connection duct element, the outer connection duct element fluidly connecting the fuel inlet valve casing with the circular duct line and the first and second inner connection duct elements connecting the circular duct line with the fuel/air mixing chamber.

In an embodiment, the outer connection duct element and the circular duct line may have the same cross-section which is larger than the cross-section of the first and the second inner connection duct elements.

In an embodiment, the first fuel feeding passage and the second fuel feeding passage may extend linearly from the fuel inlet valve casing to the fuel/air mixing chamber.

In an embodiment, the cylinder head may further comprise at least one air intake chamber for suctioning air, the air intake chamber being integrally formed with the fuel/air mixing chamber.

In an embodiment, a recess may be formed in a bottom portion of the fuel inlet valve casing, the recess defining a reservoir for fuel and being fluidly connected to the first fuel feeding passage and the second fuel feeding passage.

In an embodiment, an internal combustion engine configured to be operated with fuel, such as gaseous or liquid fuel, may comprise a cylinder head as described above.

In an embodiment, the step providing a core of the method for manufacturing a cylinder head may include the step providing a circular duct line having an inner diameter larger than an outer diameter of the core at a defined position for arranging a fuel guiding portion and the step arranging the core in the mold may include the step arranging the circular duct line in the mold such that the circular duct line is arranged around the core with a predetermined distance at the defined position for arranging the fuel guiding portion.

Although the preferred embodiments of this invention have been described herein, improvements and modifications may be incorporated without departing from the scope of the following claims.

The invention claimed is:

1. A cylinder head with at least one fuel guiding section for an internal combustion engine configured to be operated with gaseous or liquid fuel, the fuel guiding section comprising:
   a fuel inlet valve casing for accommodating a fuel inlet valve configured to control a fuel flow rate;
   a fuel/air mixing chamber for mixing the fuel with air; and
   a fuel guiding portion connecting the fuel inlet valve casing to the fuel/air mixing chamber, wherein
   the fuel guiding portion is integrally formed with the cylinder head and has a ridge-like shape extending into the fuel/air mixing chamber at an entrance to the fuel/air mixing chamber such that a first surface portion of the fuel guiding portion extends in a direction parallel to a central axis of the fuel inlet valve casing and a second surface portion of the fuel guiding portion extends obliquely to the first surface portion, and the fuel guiding portion defines at least a first fuel feeding passage and at least a second fuel feeding passage, the first fuel feeding passage and the second fuel feeding passage extending from the fuel inlet valve casing to the fuel/air mixing chamber.

2. The cylinder head of claim 1, wherein the fuel inlet valve casing is integrally formed with the cylinder head.

3. The cylinder head of claim 1, wherein a length of the first fuel feeding passage differs from a length of the second fuel feeding passage.

4. The cylinder head of claim 1, wherein the first fuel feeding passage and the second fuel feeding passage extend linearly from the fuel inlet valve casing to the fuel/air mixing chamber.

5. The cylinder head of claim 4, wherein the first fuel feeding passage and the second fuel feeding passage extend angularly to each other, at an angle between 15 and 17 degrees, from fuel inlet valve casing to the fuel/air mixing chamber.

6. The cylinder head of claim 4, wherein the first fuel feeding passage and the second fuel feeding passage extend parallel to each other.

7. The cylinder head of claim 1, wherein a cross-section of the first fuel feeding passage differs in size from a cross-section of the second fuel feeding passage.

8. The cylinder head of claim 1, wherein at least one of the first fuel feeding passage and the second fuel feeding passage extends in a curved manner from the fuel inlet valve casing to the fuel/air mixing chamber.

9. The cylinder head of claim 1, wherein a recess is formed in a bottom portion of the fuel inlet valve casing, the recess defining a reservoir for fuel and being fluidly connected to the first fuel feeding passage and the second fuel feeding passage.

10. The cylinder head of claim 9, wherein the recess is configured to provide an equal supply of fuel to the first fuel feeding passage and the second fuel feeding passage.

11. The cylinder head of claim 1, further including at least one air intake chamber for drawing air, the air intake chamber being integrally formed with the fuel/air mixing chamber.

12. The cylinder head of claim 11, wherein:
   the first fuel feeding passage is downstream of the second fuel feeding passage;
   and a length of the first fuel feeding passage is shorter than a length of the second fuel feeding passage.

13. An internal combustion engine configured to be operated with gaseous or liquid fuel, the internal combustion engine having a cylinder head with at least one fuel guiding section, the at least one fuel guiding section comprising:
   a fuel inlet valve casing for accommodating a fuel inlet valve configured to control a fuel flow rate;
   a fuel/air mixing chamber for mixing the fuel with air; and
   a fuel guiding portion connecting the fuel inlet valve casing to the fuel/air mixing chamber, wherein
   the fuel guiding portion is integrally formed with the cylinder head and has a ridge-like shape extending into the fuel/air mixing chamber at an entrance to the fuel/air mixing chamber such that a first surface portion of the fuel guiding portion extends in a direction parallel to a central axis of the fuel inlet valve casing and a second surface portion of the fuel guiding portion extends obliquely to the first surface portion, and the fuel guiding portion defines at least a first fuel feeding passage and at least a second fuel feeding passage, the first fuel feeding passage and the second fuel feeding passage extending from the fuel inlet valve casing to the fuel/air mixing chamber.

14. The internal combustion engine of claim 13, wherein the first fuel feeding passage and the second fuel feeding passage extend linearly and angularly to each other at an angle between 15 and 17 degrees from the fuel inlet valve casing to the fuel/air mixing chamber.

15. The internal combustion engine of claim 13, wherein:
   the fuel inlet valve casing is integrally formed with the cylinder head; and
   a recess is formed in a bottom portion of the fuel inlet valve casing, the recess defining a reservoir for fuel and being fluidly connected to the first fuel feeding passage and the second fuel feeding passage, and being configured to provide an equal supply of fuel to the first fuel feeding passage and the second fuel feeding passage.

* * * * *